US012746844B2

(12) United States Patent
Salter et al.

(10) Patent No.: US 12,746,844 B2
(45) Date of Patent: Sep. 29, 2026

(54) SYSTEMS AND METHODS FOR TRANSFERRING ENERGY FROM A VEHICLE

(71) Applicant: Ford Global Technologies, LLC, Dearborn, MI (US)

(72) Inventors: Stuart C. Salter, White Lake, MI (US); Vyas Darshan Shenoy, Canton, MI (US); Brendan Diamond, Grosse Pointe, MI (US); Mark J. Ferrel, Brighton, MI (US); Ryan O'Gorman, Beverly Hills, MI (US); Todd Ansbacher, Westland, MI (US)

( * ) Notice: Subject to any disclaimer, the term of this patent is extended or adjusted under 35 U.S.C. 154(b) by 16 days.

(21) Appl. No.: 18/434,307

(22) Filed: Feb. 6, 2024

(65) Prior Publication Data

US 2025/0249786 A1 Aug. 7, 2025

(51) Int. Cl.

*B60L 55/00* (2019.01)
*H02J 3/32* (2006.01)
*H02J 9/06* (2006.01)

(52) U.S. Cl.

CPC .............. *B60L 55/00* (2019.02); *H02J 3/322* (2020.01); *H02J 9/06* (2013.01); *Y04S 10/126* (2013.01)

(58) Field of Classification Search

CPC ... B60L 55/00; H02J 3/322; H02J 9/06; Y04S 10/126
See application file for complete search history.

(56) References Cited

U.S. PATENT DOCUMENTS 12,240,347 B2* 3/2025 Lu .......................... B60L 53/68
2010/0017045 A1 1/2010 Nesler et al.
2023/0029931 A1* 2/2023 Lin .......................... B60L 53/68
2023/0182614 A1 6/2023 Mo et al.
2023/0231409 A1* 7/2023 Xu .......................... H02J 9/068 307/65
2023/0415602 A1* 12/2023 Salter ...................... B60L 53/63

FOREIGN PATENT DOCUMENTS

JP 2015092821 A 5/2015

OTHER PUBLICATIONS

FixOrRepairDIY, Ultimate Guide to Ford F-150 Pro Power Onboard! (How to Power Your Home During an Outage), Jan. 12, 2023, pp. 1-8.
Michael J. Coren, Electric Vehicles Can Now Power Your Home for Three Days, Climate Coach, Feb. 7, 2023, pp. 1-6.
Thomas Horschig, et.al., How Vehicle-To-Everything (V2X) Can Turbocharge the Energy Transition, DNV, https://www.dnv.com/energy-transition-outlook/v2x.html, Apr. 4, 2023, pp. 1-7.

* cited by examiner

*Primary Examiner* — Daniel Cavallari
(74) *Attorney, Agent, or Firm* — Frank Lollo; Eversheds Sutherland (US) LLP

(57) ABSTRACT

A transfer switch for transferring power to a building is disclosed. The transfer switch may include a detection unit configured to monitor a utility power supply from a power grid. The transfer switch may further include a processor configured to determine that a power supply communication between the transfer switch and a vehicle is established, and determine that a predefined condition is met based on inputs associated with the utility power supply obtained from the detection unit, when the power supply communication is established. The processor may be further configured to enable the vehicle to supply power to the building responsive to a determination that the predefined condition is met.

9 Claims, 4 Drawing Sheets

SYSTEMS AND METHODS FOR TRANSFERRING ENERGY FROM A VEHICLE

FIELD

The present disclosure relates to systems and methods for transferring energy from a vehicle to a building via a transfer switch.

BACKGROUND

Many modern vehicles are configured to supply power to external systems/tools such as chop saws, air compressors, and/or other electric devices using vehicle's on-board power source. In some cases, the vehicles are used to provide power to a building (e.g., a house) in case of power outage or to optimize consumer's spend on energy obtained from the power grid, (e.g., during those time durations of the day when the charges for the energy drawn from the power grid may be high).

In order to supply power from the vehicle to the building, a user may need a separate device and may not simply connect a cable between the vehicle's on-board power source and a building power plug to transfer the power. This is because the outlets associated with the vehicle's on-board power source are ground-fault circuit interrupter (GFCI) protected outlets and have bonded neutral generators, which shuts-off electric power when a ground fault is detected by the vehicle. In some scenarios, Automatic Transfer Switches (ATSs) are used to connect the vehicle to the building, to transfer power from the vehicle's on-board power source to the building.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
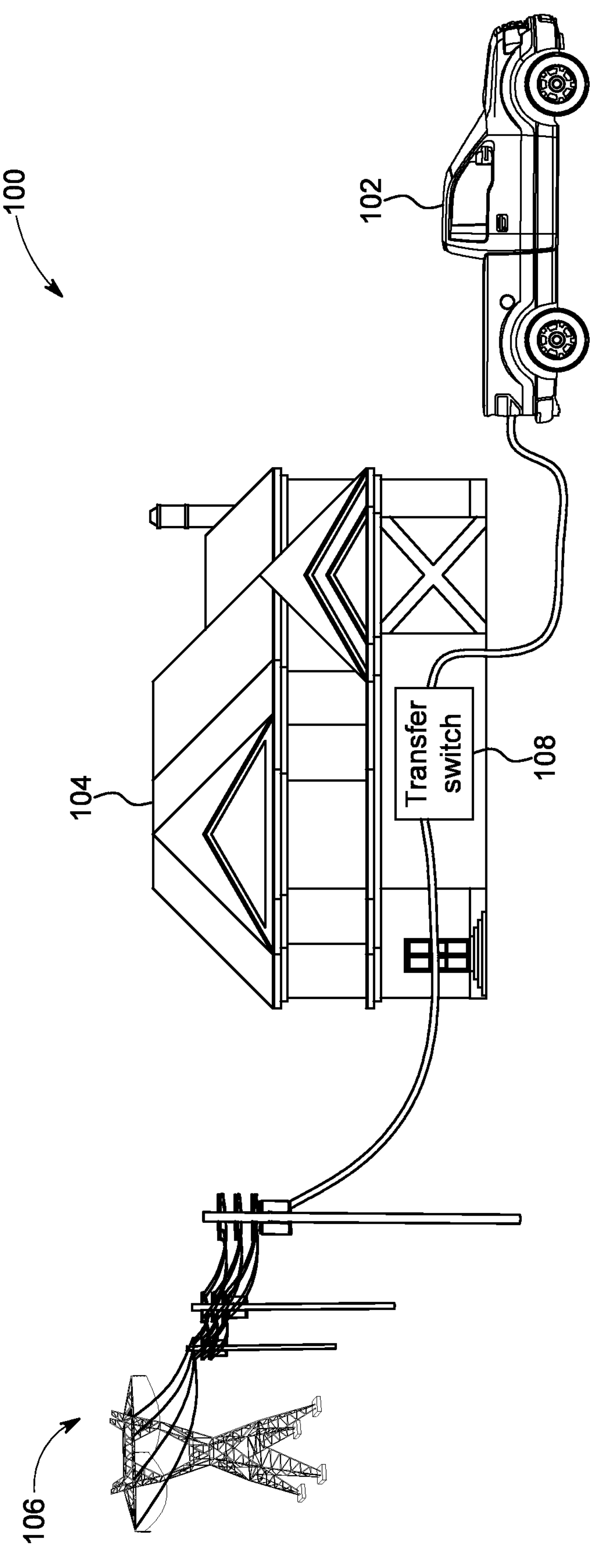
FIG. 1 depicts an example environment in which techniques and structures for providing the systems and methods disclosed herein may be implemented.

The present disclosure describes a system and method to supply power to a building (e.g., a house) via a vehicle (e.g., via vehicle's on-board power source), when utility power supply from power grid may be interrupted. The system may include a transfer switch that may be installed at the building. The transfer switch may be communicatively coupled with the vehicle via a network (e.g., a wireless network).

In some aspects, the switch may be configured to detect that the utility power supply may be interrupted when, for example, there may be no power supply from the power grid or the utility power supply may be unstable. Responsive to detecting that the utility power supply may be interrupted, the switch may disable a power supply connection between the power grid and the house, and enable a power supply connection between the vehicle and the house to enable the vehicle to supply power to the house. In further aspects, when the vehicle may be supplying power to the house, the switch may detect that the utility power supply may be restored. Responsive to such detection, the switch may disable the power supply connection between the vehicle and the house, and enable the power supply connection between the power grid and the house to allow the power grid to supply power to the house. Stated another way, the switch may "switch" the power supply from the vehicle back to the power grid when the utility power supply may be restored.

In further aspects, the switch may determine an appropriate time to switch the power supply from the vehicle to the power grid, when the utility power supply may be restored. For example, the switch may enable the power supply connection between the power grid and the house when the utility power supply may be stabilized. Further, in a scenario where a vehicle State of Charge (SOC) level (associated with the vehicle's on-board power source) is less than a first threshold value, the switch may enable the power supply connection between the power grid and the house, even when the utility power supply may not be stabilized. In another scenario where the load requirement of the house may be greater than a second threshold value, the switch may enable the power supply connection between the power grid and the house, even when the utility power supply may not be stabilized.

In some aspects, the switch may perform the switching (e.g., from the power grid to the vehicle) after determining that a power supply communication between the vehicle and the switch is successfully established. The switch may determine that the power supply communication between the vehicle and the switch may be successfully established based on inputs/signals (e.g., an activation signal) obtained from the vehicle.

In additional aspects, to enable the vehicle to supply power to the house (e.g., via a power cable), a vehicle user may request the vehicle to activate a vehicle power transfer mode. Responsive to obtaining such a request from the user, the vehicle may output a notification requesting the vehicle user to connect one end of the power cable to an outlet (e.g., 240 Volt outlet) associated with the vehicle's on-board power source, without connecting the other end of the cable to any device/component. The vehicle may then perform a "cable integrity test" of the power cable and determine that the cable is not malfunctioning (and valid path exits for supplying the power) based on the cable integrity test. Responsive to a determination that the cable is not malfunctioning, the vehicle may request the vehicle user to connect the other end of the power cable to the switch. The vehicle may then activate the vehicle power transfer mode, and transmit the activation signal described above to the switch, indicating to the switch that the vehicle power transfer mode is activated. The switch may receive the activation signal, and determine that the power supply communication is successfully established when the activated signal is received. Responsive to determining that the power supply communication is established, the switch may determine that the vehicle is "ready" to supply power to the house.

In some aspects, when the vehicle power transfer mode is activated, the vehicle may disable vehicle movement to prevent interruption in supplying power to the house. The vehicle may further disable a 110 Volt outlet of the power source for security purposes, and/or activate a vehicle light in a predetermined pattern to notify/indicate that the vehicle may be supplying power to the house. The vehicle may additionally output an alert notification when a person/object may be approaching the vehicle, when the vehicle power transfer mode may be activated.

The present disclosure discloses a system and method to provide power to a house via the power grid and a vehicle. The system includes a smart transfer switch that communicates with the vehicle via a wireless network, and enables the vehicle to efficiently transfer power to the house. In addition, the switch masks the ground fault, thereby enabling the vehicle to supply power to the house. Further, the switch automatically detects an appropriate time to enable the power supply connection between the power grid and the house based on vehicle operational parameter and/or power supply from the power grid.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 and a building 104 (or a house 104). The vehicle 102 may take the form of any passenger or commercial vehicle such as, for example, a car, a work vehicle, a crossover vehicle, a truck, a van, a minivan, a taxi, a bus, etc. The vehicle 102 may be a manually driven vehicle, and/or may be configured to operate in a partially or fully autonomous mode. In some aspects, the vehicle 102 may be include any powertrain such as a gasoline engine, a hybrid system, etc.

Figure 2:
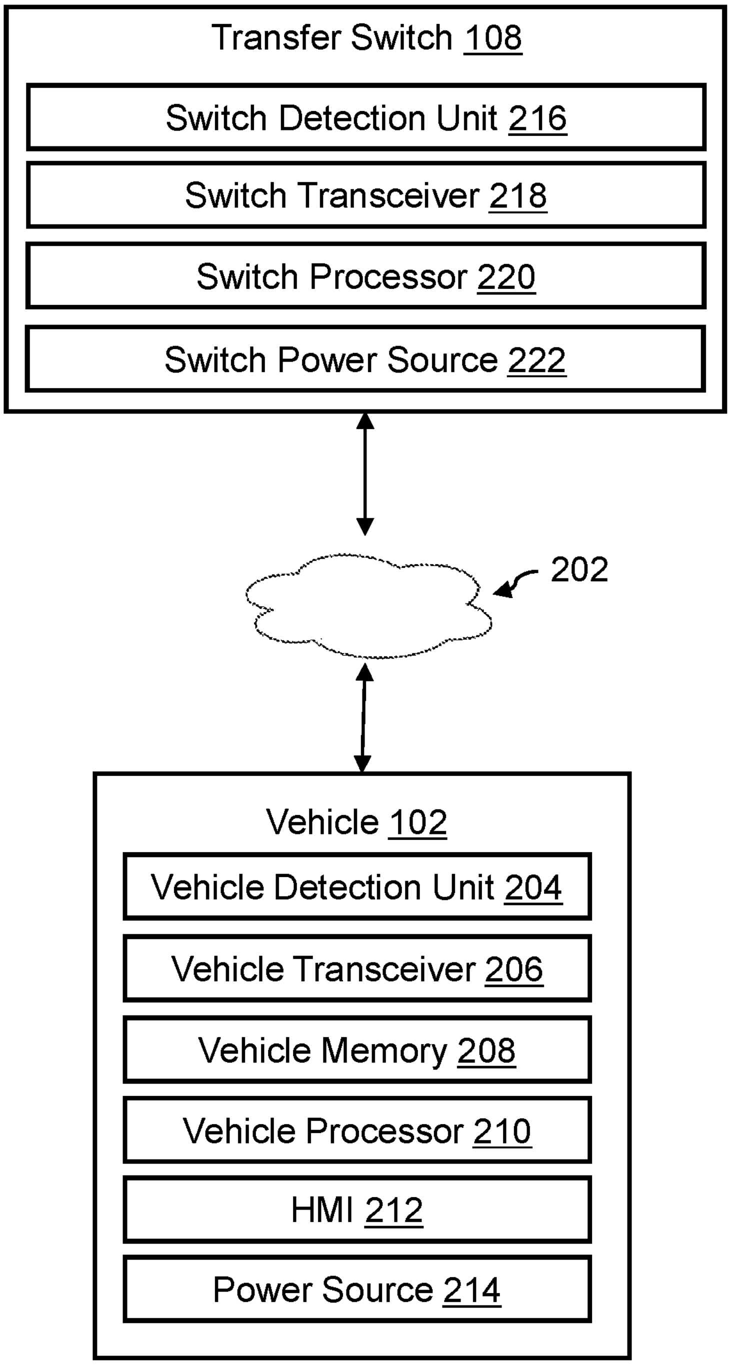
FIG. 2 depicts a block diagram of an example transfer switch and a vehicle in accordance with the present disclosure.

The house 104 may include one or more house equipment that may be powered by energy drawing from a utility power grid 106 and/or the vehicle 102 (e.g., via a vehicle's on-board power source, shown as power source 214 in FIG. 2). Examples of house equipment include, but are not limited to, a heating, ventilation, and air conditioning (HVAC) system, fans, lights, refrigerator, electronic equipment, and/or the like. In some aspects, the vehicle 102 may supply energy to the house 104 to power the house equipment when the utility power supply from the utility power grid 106 may be interrupted (e.g., when there is no power or when the power from the utility power grid 106 is not stable), or when the energy requirements of the house 104 may be greater than the energy that the utility power grid 106 may provide, or when a house/vehicle owner requests (via a user device) the vehicle 102 to supply energy to the house 104.

The scenarios described above for supplying energy from the vehicle 102 to the house 104 are exemplary in nature and for illustrative purpose only. The described scenarios should not be construed as limiting. The vehicle or house owner may request the vehicle 102 to supply energy to the house 104 at any time, based on user requirements and/or energy supply or requirement conditions.

The house 104 may include a transfer switch 108 (hereinafter referred as switch 108) that may enable transfer of power to the house 104 via the utility power grid 106 and/or the vehicle 102. In some aspects, the switch 108 may be installed at the house 104. The switch 108 may be configured to automatically switch between different power sources to power the house 104. For example, the switch 108 may be connected to the utility power supply (associated with the utility power grid 106) and the vehicle's on-board power source, and the switch 108 may be configured to switch power supply to the house 104 from the utility power grid 106 to the vehicle 102, and vice-versa. In further aspects, the switch 108 may include a small battery/power source configured to power one or more transfer switch components when there may be no power.

In some aspects, the switch 108 may be a double-pole manual transfer switch with a third-pole for the neutral that switches sequentially. The switch 108 may be configured to mask ground fault associated with the vehicle's on-board power, which enables the vehicle 102 to efficiently transfer the power to the house 104.

In some aspects, the switch 108 may be communicatively coupled to the vehicle 102 via a network (shown as network 202 in FIG. 2). The network(s) illustrates an example communication infrastructure in which the connected devices discussed in various embodiments of this disclosure may communicate. The network(s) may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In some aspects, to enable power supply from the vehicle 102 to the house 104, the switch 108 may first determine if a power supply communication between the switch 108 and the vehicle 102 (e.g., the vehicle's on-board power source) is effectively established. The power supply communication may be established when a power transfer cable ("cable") may be connected between the switch 108 and the vehicle 102. The cable, as described herein, may be any cable that may transfer power/energy from the vehicle 102 to the switch 108 (and hence to the house 104). In some aspects, the switch 108 may determine if the power supply communication is established or not based on signals/confirmation obtained from the vehicle 102. For example, the switch 108 may determine that the power supply communication may be established when the vehicle 102 transmits an activation signal to the switch 108. The activation signal may indicate to the switch 108 that a vehicle power transfer mode is activated in the vehicle 102, thereby indicating that the power supply communication is successfully established. In some aspects, the vehicle 102 may transmit the activation signal to the switch 108 when the vehicle 102 determines that the cable is not malfunctioning, after performing a cable integrity test (or a cable continuity test). Further details of the activation signal transmitted by the vehicle 102 and the cable integrity test performed by the vehicle 102 are described below in conjunction with FIG. 2.

Responsive to determining that the power supply communication with the vehicle 102 may be established, the switch 108 may monitor power supply from the utility power grid 106. When the power supply from the utility power grid 106 may be interrupted (e.g., when there may be no power from the utility power grid 106 or the power supply may not be stabilized), the switch 108 may enable the vehicle 102 to supply power to the house 104. Stated another way, when the power supply from the utility power grid 106 may be interrupted, the switch 108 may disable the power supply connection between the utility power grid 106 and the house 104 and enable the power supply connection between the vehicle 102 and the house 104, to enable the vehicle 102 to supply power to the house 104. In this manner, the switch 108 "switches" the power supply to the house 104, from the utility power grid 106 to the vehicle 102, when the utility power supply may be interrupted.

Furthermore, responsive to enabling the power supply connection between the vehicle 102 and house 104, the switch 108 may continue to monitor the utility power supply. The switch 108 may switch the power supply to the house 104 back to the utility power grid 106, when the switch 108 determines that the power supply from the utility power grid 106 may be restored and stabilized (e.g., based on the monitoring of power supply). Stated another way, the switch 108 may enable the utility power grid 106 to supply power to the house 104, when the utility power supply may be restored and stabilized. In this case, the switch 108 may disable the power supply connection between the vehicle 102 and the house 104, and enable the power supply connection between the utility power grid 106 and the house 104, to enable the utility power grid 106 to supply power to the house 104.

As described above, the switch 108 may enable the utility power grid 106 to supply power to the house 104 when the utility power supply may be stabilized. To check whether the utility power supply may be stabilized, the switch 108 may monitor grid source voltage and phase, and may determine that the power supply may be stabilized when the magnitude and variation from an expected waveform may be within certain variability thresholds for a predefined time duration. In a scenario where the utility power supply may not be stabilized (but restored), the switch 108 may not enable the power supply connection between the utility power grid 106 and the house 104, and may continue to supply power to the house 104 from the vehicle 102.

In further aspects, the switch 108 may obtain one or more vehicle operational parameters from the vehicle 102 at a predefined frequency, when the vehicle 102 may be supplying power to the house 104. The vehicle operational parameters may include, but is not limited to, a current State of Charge (SOC) level associated with the vehicle on-board power source, a real-time load consumption by the house 104, discharge power limits, and/or the like. Responsive to obtaining the vehicle operational parameters, the switch 108 may determine an appropriate time to switch the power supply to the house 104 from the vehicle 102 to the utility power grid 106 or to disable the supply of power from the vehicle 102 to the house 104, based on the vehicle operational parameters. As an example, the switch 108 may disable the power supply connection between the vehicle 102 and the house 104 (and enable the power supply connection between the utility power grid 106 and the house 104, if the utility power source is restored/available), when the switch 108 determines that the vehicle SOC level may be less than a predetermined threshold (e.g., 20%). In some aspects, in this case, the switch 108 may still switch the power supply from the vehicle 102 to the utility power grid 106 if the utility power supply may be restored but not yet stabilized.

In additional aspects, the vehicle 102 may be configured to perform one or more predefined actions when the vehicle 102 may be supplying power to the house 104 or may be "ready" to supply power to the house 104 (i.e., when the vehicle power transfer mode may be activated). For example, the vehicle 102 may disable a vehicle movement to prevent interruption in supplying power to the house 104, when the vehicle power transfer mode may be activated. As another example, the vehicle 102 may activate one or more vehicle exterior and/or interior lights in a predetermined pattern when the vehicle power transfer mode may be activated, to indicate to one or more users who may be located in proximity to the vehicle 102 that the vehicle 102 may be transferring power to the house 104. In an exemplary aspect, the vehicle 102 may flash a vehicle exterior light every three seconds to indicate that the vehicle 102 may be supplying power to the house 104.

As yet another example, the vehicle 102 (via vehicle cameras/sensors) may monitor a vehicle surrounding when the vehicle power transfer mode may be activated, and detect a presence of an object in proximity of the vehicle 102. Responsive to detecting the object, the vehicle 102 may output an alert notification (e.g., via vehicle speakers), to indicate to the object that the vehicle 102 may be supplying power to the house 104. As yet another example, the vehicle 102 may disable a 110 Volt outlet of the vehicle's on-board power source when the vehicle power transfer mode may be activated (e.g., for security purposes, as ground fault may have been masked to power the house 104).

The examples described above should not be construed as limiting, and vehicle 102 may perform additional actions, without departing from the present disclosure scope.

In some aspects, some of the steps described above may be performed by the switch 108 instead of the vehicle 102. Similarly, some of the steps described above may be performed by the vehicle 102 instead of the switch 108. The details of the vehicle 102 and the switch 108 are described below in conjunction with FIG. 2.

The vehicle 102 and the switch 108 implement and/or perform operations, as described here in the present disclosure, in accordance with the owner manual and safety guidelines. In addition, any action taken by the user based on notifications provided by the vehicle 102 and/or the switch 108 should comply with all the rules specific to the location and operation of the vehicle 102 (e.g., Federal, state, country, city, etc.). The notifications, as provided by the vehicle 102 and/or the switch 108, should be treated as suggestions and only followed according to any rules specific to the location and operation of the vehicle 102.

Figure 3:
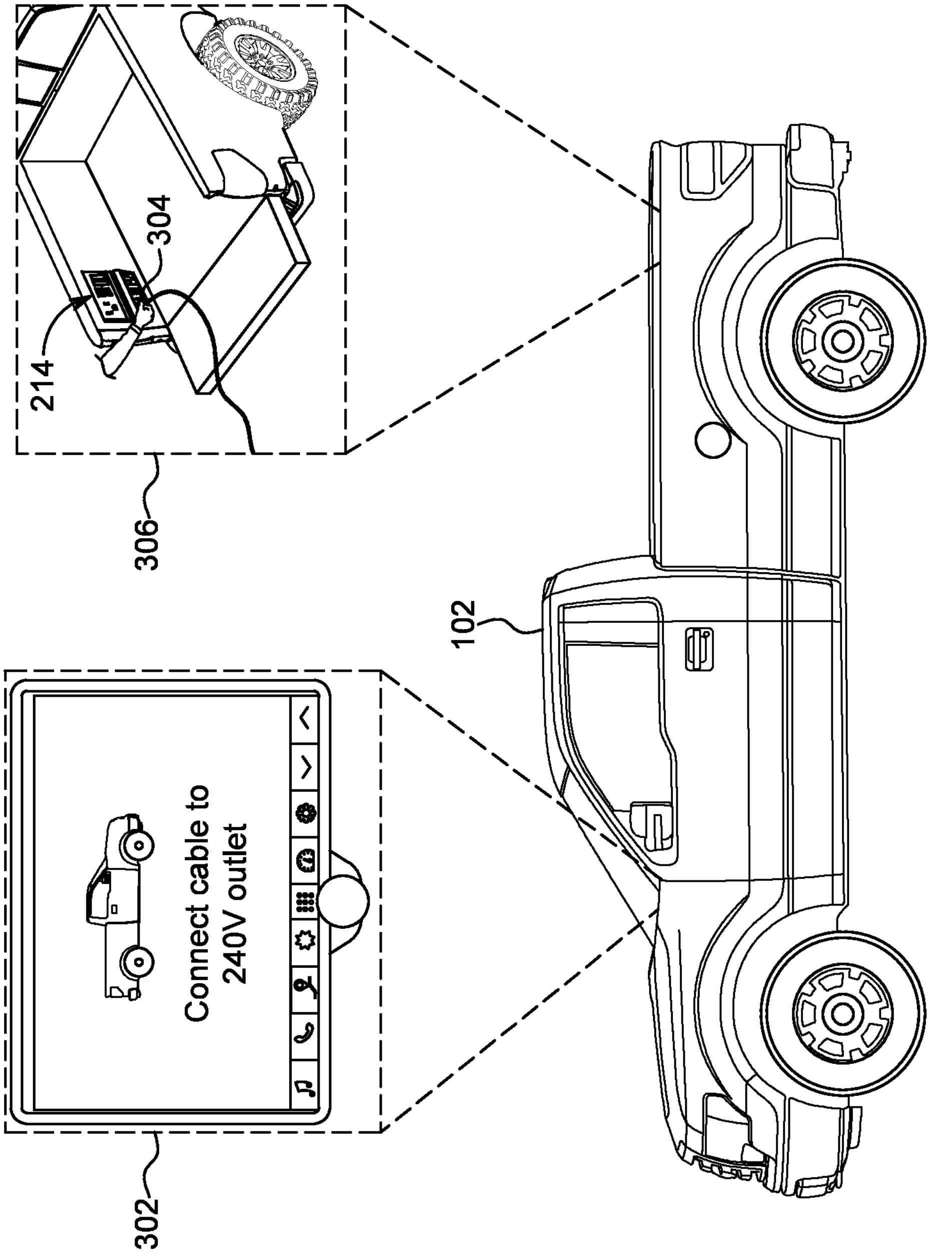
FIG. 3 depicts an example snapshot of a vehicle user connecting a cable to a vehicle power source, in accordance with the present disclosure.

FIG. 2 depicts a block diagram of the transfer switch 108 and the vehicle 102 in accordance with the present disclosure. FIG. 2 will be described in conjunction with FIG. 3.

As described in FIG. 1, the switch 108 may be communicatively coupled with the vehicle 102, via one or more networks 202 (or network 202). The examples of the network 202 are described above in conjunction with FIG. 1.

The vehicle 102 may include a plurality of units including, but not limited to, a vehicle detection unit 204, a vehicle transceiver 206, a vehicle memory 208, a vehicle processor 210, a vehicle Human-Machine Interface 212 (or HMI 212), and a power source 214 (e.g., an on-board vehicle power source), which may be communicatively coupled with each other.

In some aspects, the power source 214 may be configured to supply power to the house 104, via a power cable or "cable" and the switch 108. In an exemplary aspect, the power source 214 may have a power capacity of 7,200

Watts. The power source 214 may include any count of outlets of same or different voltages. For example, the power source 214 may include a 240 Volt outlet and a plurality of 110 Volt (or 120 Volt) outlets, which may be located on or in proximity to a vehicle bed (e.g., a truck bed or cargo bed).

The vehicle detection unit 204 may include one or more components including, but not limited to, vehicle cameras, ultrasonic sensors, Radio Detection and Ranging (radar) sensors, Light Detection and Ranging (lidar) sensors, thermal cameras, and/or the like. In an exemplary aspect, the vehicle detection unit 204 may be configured to monitor vehicle surrounding when the vehicle 102 may be supplying power to the house 104 via the switch 108. In further aspects, the vehicle detection unit 204 may be configured monitor vehicle operational parameters including, but not limited to, a current State of Charge (SOC) level associated with the power source 214, a real-time load consumption by the house 104 (when the vehicle 102 may be supplying power to the house 104), discharge power limits, and/or the like.

The vehicle transceiver 206 may be configured to transmit/receive signals/information/data to/from external systems and devices via the network 202. For example, the vehicle transceiver 206 may transmit information/signals/data (including the activation signal) to the switch 108 via the network 202. As another example, the vehicle transceiver 206 may receive information from the vehicle detection unit 204 and transmit the information to the switch 108 via the network 202.

The vehicle processor 210 may be disposed in communication with one or more memory devices disposed in communication with the respective computing systems (e.g., the vehicle memory 208 and/or one or more external databases not shown in FIG. 2). The vehicle processor 210 may utilize the vehicle memory 208 to store programs in code and/or to store data for performing aspects in accordance with the disclosure. The vehicle memory 208 may be a non-transitory computer-readable storage medium or memory storing a program code that enables the vehicle processor 210 to perform operations in accordance with the present disclosure. The vehicle memory 209 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

The HMI 212 may be configured to receive user inputs and/or user requests to control vehicle operation. For example, the HMI 212 may be configured to receive a user request to activate a vehicle power transfer mode to supply power to the house 104 (e.g., via the switch 108). In addition, the HMI 212 may be configured to output one or more notifications to the vehicle operator/user. For example, the HMI 212 may output notification to connect the power cable to the vehicle 102 and/or the switch 108, to enable supply of power from the vehicle 102 to the house 104 via the switch 108. In this case, the cable may transfer power from the vehicle 102 to the house 104, via the switch 108.

The switch 108 may include a plurality of components including, but not limited to, a switch detection unit 216, a switch transceiver 218, a switch processor 220, and a switch power source 222, which may be communicatively coupled with each other. The switch power source 222 may include a small battery/power source configured to power the switch 108 when there may be no power.

The switch detection unit 216 may be configured to monitor the utility power supply from the utility power grid 106, and/or a power consumption by the house 104. The switch transceiver 218 may be configured to transmit/receive signals/information/data to/from external systems and devices including the vehicle 102 (e.g., via the vehicle transceiver 206). For example, the switch transceiver 218 may transmit inputs associated with the monitoring of the utility power supply to the vehicle 102.

The switch processor 220 may be disposed in communication with one or more memory devices disposed in communication with the respective computing systems (e.g., a switch memory and/or one or more external databases, not shown in FIG. 2). In some aspects, the switch memory may be similar to the vehicle memory 208, and the switch processor 220 may be similar to the vehicle processor 210.

In operation, a vehicle user may park the vehicle 102 in a garage associated with the house 104. The vehicle user may then use the HMI 212 to request the vehicle 102 to activate a vehicle power transfer mode, to enable the vehicle 102 to supply power to the house 104 via the switch 108. The vehicle processor 210 may obtain the request from the HMI 212. Responsive to obtaining the request, the vehicle processor 210 may output a first notification (as shown in view 302 of FIG. 3) to the vehicle user via the HMI 212, requesting the vehicle user to connect a cable proximal end 304 (of the power cable) to the power source 214 and not to connect a cable distal end to any device/component. In some aspects, the first notification requests the vehicle user to connect the cable proximal end 304 to the 240 Volt outlet of the power source 214 to enable the supply of power to the house 104. The vehicle user may view the first notification and may connect the cable proximal end 304 to the power source 214, as shown in view 306 of FIG. 3. After connecting/inserting the cable proximal end 304 to the power source 214, the vehicle user may confirm that the vehicle user has inserted/connected the cable proximal end 304, via the HMI 212. The vehicle processor 210 may obtain the user confirmation from the HMI 212.

Responsive to obtaining the user confirmation, the vehicle processor 210 may perform a cable integrity test of the power cable. The cable integrity test may be performed to check that there is no continuity between wires and there is no breakage in the cable. Based on the cable integrity test, the vehicle processor 210 may determine that the cable may not be malfunctioning (i.e., there is no continuity between wires and there is no breakage in the cable).

Responsive to determining that the cable is not malfunctioning, the vehicle processor 210 may output a second notification to the vehicle user via the HMI 212 (and/or via vehicle's sound exciters), requesting the vehicle user to connect a cable distal end to the switch 108. The vehicle user may view the second notification and may insert/connect the cable distal end to the switch 108. After inserting/connecting the cable distal end, the vehicle user may confirm that the vehicle user has inserted the cable distal end, via the HMI 212. The vehicle processor 210 may then obtain the user conformation from the HMI 212.

Responsive to obtaining the user confirmation, the vehicle processor 210 may activate the vehicle power transfer mode to enable transfer of power from the power source 214 to the house 104 via the switch 108. Stated another way, the vehicle processor 210 may activate the vehicle power transfer mode when the cable distal end may be connected to the switch 108 (and the cable proximal end 304 may be connected to the power source 214). Responsive to activating the vehicle power transfer mode, the vehicle processor 210 may transmit an activation signal to the switch 108 indicating that the vehicle power transfer mode is activated, via the vehicle transceiver 206 and the switch transceiver 218.

The switch transceiver 218 may receive the activation signal from the vehicle transceiver 206, and may transmit the activation signal to the switch processor 220. The switch processor 220 may obtain the activation signal from the switch transceiver 218, and may determine that a power supply communication between the vehicle 102 and the switch 108 may be established, responsive to obtaining the activation signal.

When the power supply communication between the vehicle 102 and the switch 108 may be established, the switch processor 220 may monitor the utility power supply to determine if a first predefined condition may be met. In some aspects, the switch processor 220 may determine that the first predefined condition may be based on the inputs associated with the utility power supply obtained from the switch detection unit 216 (e.g., based on monitoring of the utility power supply from the utility power grid 106). In some aspects, the first predefined condition may be met when the utility power supply may be interrupted. When the first predefined condition may be met, the switch processor 220 may enable the vehicle 102 (e.g., the power source 214) to supply power to the house 104 via the switch 108. Stated another way, when the first predefined condition may be met, the switch processor 220 may disable the power supply connection between the utility power grid 106 and the house 104, and enable the power supply connection between the vehicle 102 and the house 104 to enable the vehicle 102 to supply power to the house 104. In this manner, the switch processor 220 "switches" the power supply from the utility power grid 106 to the vehicle 102, when the first predefined condition may be met.

In some aspects, to enable the vehicle 102 to supply power to the house 104 when the first predefined condition may be met, the switch processor 220 may transmit, via the switch transceiver 218, a wakeup signal to the vehicle 102 responsive to a determination that the first predefined condition may be met. Responsive to receiving the wakeup signal from the switch processor 220, the vehicle 102 may commence to supply power to the house 104 via the switch 108. Stated another way, the vehicle 102 may commence to supply power to the house 104 from the power source 214, when the vehicle 102 receives the wakeup signal from the switch processor 220.

Responsive to enabling the vehicle 102 to supply power to the house 104, the switch processor 220 may continue to monitor the utility power supply, and may determine that a second predefined condition may be met based on the monitoring. The switch processor 220 may determine that the second predefined condition may be met based on the inputs associated with the utility power supply obtained from the switch detection unit 216 (e.g., based on the monitoring of the utility power supply from the utility power grid 106). In some aspects, the second predefined condition may be met when the utility power supply may be restored and stabilized. When the second predefined condition may be met, the switch processor 220 may enable the utility power grid 106 to supply power to the house 104 via the switch 108. Stated another way, when the second predefined condition may be met, the switch processor 220 may disable the power supply connection between the vehicle 102 and the house 104, and enable the power supply connection between the utility power grid 106 and the house 104 to enable the utility power grid 106 to supply power to the house 104. In this manner, the switch 108 "switches" back the supply of power from the vehicle 102 to the utility power grid 106, when the second predefined condition is met. At this point, if the vehicle user disconnects the cable from the vehicle 102 and/or the switch 108, the vehicle power transfer mode may be disabled by the vehicle processor 210.

In some aspects, to ascertain whether the utility power supply may be stable, the switch processor 220 may monitor the grid source voltage and phase (via the switch detection unit 216), and may determine that the utility power supply may be stabilized when the magnitude and variation from expected waveform may be within certain variability thresholds for a predefined time duration (e.g., 2-5 minutes). In a scenario where the utility power supply is not stable (but restored), the switch processor 220 may not enable the power supply connection between the utility power grid 106 and the house 104, and may continue to supply power to the house 104 from the vehicle 102.

In further aspects, the switch processor 220 may obtain the vehicle operational parameters (such as the vehicle SOC level) from the vehicle 102 (via the vehicle transceiver 206 and the switch transceiver 218) at a predefined frequency or when the vehicle 102 may be supplying power to the house 104 via the switch 108. Based on the vehicle operational parameter(s), the switch processor 220 may determine whether a third predefined condition may be met. In some aspects, the third predefined condition may be met when the vehicle SOC level may be less than a first predetermined threshold (e.g., less than 20%). When the third predefined condition may be met, the switch processor 220 may disable the vehicle 102 from supplying power to the house 104. In this case, the switch processor 220 may disable the power supply connection between the vehicle 102 and the house 104, and enable the power supply connection between the utility power grid 106 and the house 104 when the third predetermined condition may be met (even if the power supply from the utility power grid 106 may not be stabilized).

In other aspects, the third predefined condition may be met when load requirements associated with the house 104 may be greater than a second predetermined threshold or when the power discharge limit associated with the vehicle 102 (e.g., the power source 214) may be reached. In this case also, the switch processor 220 may disable the power supply connection between the vehicle 102 and the house 104, responsive to determining that the third predefined condition may be met.

In further aspects, when the vehicle 102 may be supplying power to the house 104 or be "ready" to supply power to the house 104 (i.e., when the vehicle power transfer mode may be activated), the vehicle processor 210 may disable vehicle movement (or lock the vehicle 102 in the garage) to prevent interruption in supplying the power to the house 104. In additional aspects, the vehicle processor 210 may activate one or more vehicle lights in a predetermined pattern when the vehicle power transfer mode may be activated. For example, the vehicle 102 may flash a specific vehicle light every three seconds to indicate that the vehicle 102 may be supplying power to the house 104.

In further aspects, the vehicle processor 210 (e.g., via the vehicle detection unit 204) may monitor a vehicle surrounding when the vehicle power transfer mode may be activated. When the vehicle processor 210 detects a presence of an object (e.g., a user) in proximity of the vehicle 102, the vehicle processor 210 may output an alert notification to the object responsive to the detection, via one or more vehicle components. For example, the vehicle processor 210 may output the alert notification by activating vehicle exterior sound exciters, external displays, or by rapidly flashing vehicle exterior lights or increasing intensity of the flashing lights, indicating to the object that the vehicle 102 may be supplying power to the house 104. In further aspects, the vehicle processor 210 may disable a 110 Volt outlet of the power source 214 when the vehicle power transfer mode may be activated (e.g., for security purposes as ground fault may be masked to power the house 104).

In further aspects, when the vehicle user expects a scenario of power outage in future, the vehicle user may park the vehicle 102 in the garage and activate the vehicle power transfer mode in the manner described above. When the power from the utility power grid 106 is may be interrupted, the switch processor 220 may transmit a wakeup signal to the vehicle processor 210, and enable the vehicle 102 (e.g., the power source 214) to provide power to the house 104 via the switch 108, as described above.

Figure 4:
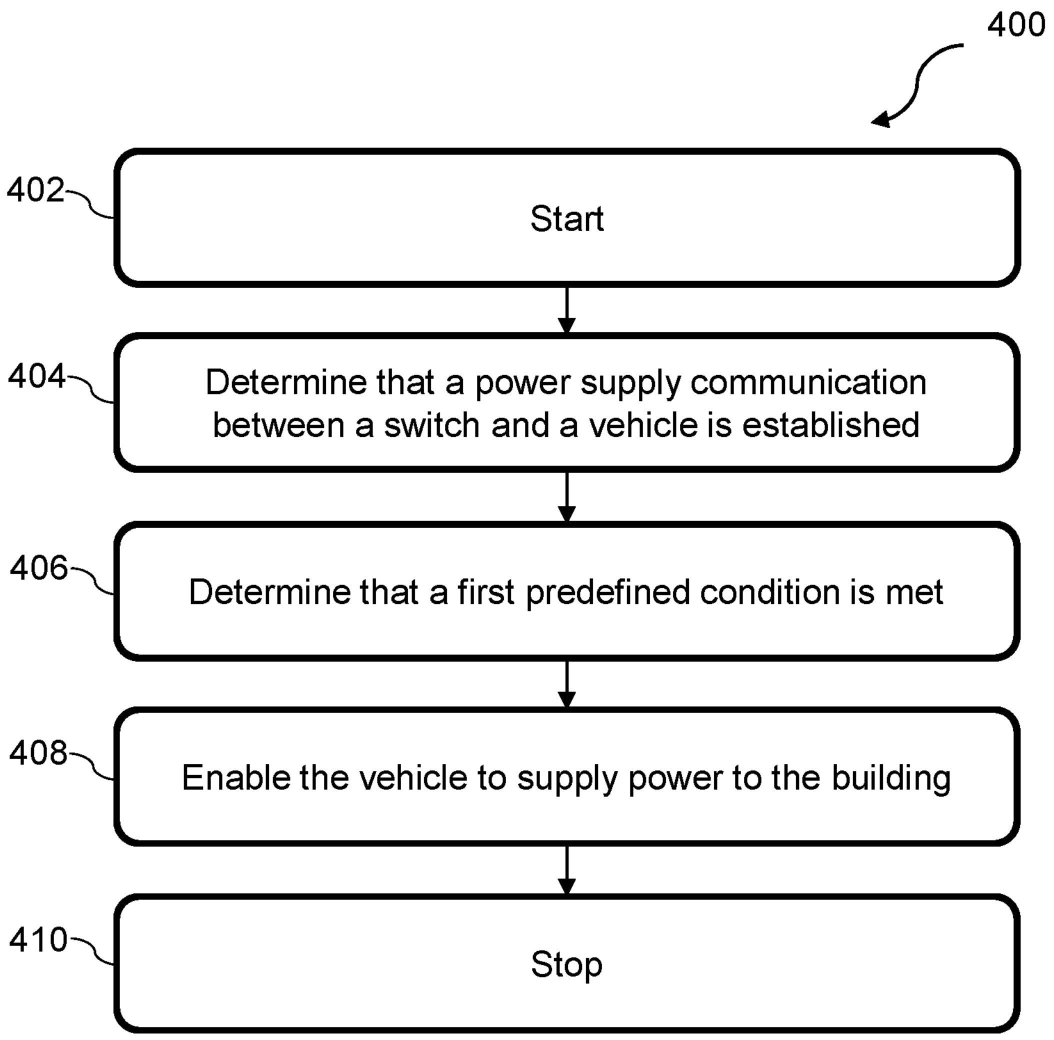
FIG. 4 depicts a flow diagram of an example method to supply energy from a vehicle to a building via a transfer switch in accordance with the present disclosure.

FIG. 4 depicts a flow diagram of an example method 400 to supply energy from the vehicle 102 to a building (e.g., the house 104) via the switch 108, in accordance with the present disclosure. FIG. 4 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 400 starts at step 402. At step 404, the method 400 may include determining, by the switch processor 220, that a power supply communication between the switch 108 and the vehicle 102 may be established. The switch processor 220 may determine that the power supply communication may be established based on the activation signal obtained from the vehicle 102. The description of the activation signal may be understood in conjunction with figures described above.

At step 406, the method 400 may include determining, by the switch processor 220, that a predefined condition may be met, when the power supply communication may be established. In some aspects, the switch processor 220 may determine that the predefined condition may be met based on the inputs associated with the utility power supply obtained from the switch detection unit 216. As described above, the predefined condition may be met when the utility power supply may be interrupted.

At step 408, the method 400 may include enabling, by the switch processor 220, the vehicle 102 to supply power to the house 104 responsive to a determination that the first predefined condition may be met.

At step 410, the method 400 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A transfer switch for transferring power to a building, the transfer switch comprising:

a switch detection unit including at least one sensor configured to monitor a utility power supply from a power grid; and a switch processor communicatively coupled to the switch detection unit, wherein the switch processor is configured to:

obtain an activation signal from the vehicle, wherein the activation signal indicates that a vehicle power transfer mode is activated; and determine that the power supply communication between the transfer switch and the vehicle is established responsive to obtaining the activation signal;

determine that a power supply communication between the transfer switch and a vehicle is established;

determine that a first predefined condition is met based on inputs associated with the utility power supply obtained from the switch detection unit; and enable the vehicle to supply power to the building responsive to a determination that the first predefined condition is met.

2. The transfer switch of claim 1, wherein the first predefined condition is met when the utility power supply is interrupted.

3. The transfer switch of claim 1, wherein the switch processor is further configured to:

determine that a second predefined condition is met based on the inputs obtained from the switch detection unit, and wherein the second predefined condition is met when the utility power supply is restored and stabilized; and enable the power grid to supply power to the building.

4. The transfer switch of claim 1, wherein the switch processor is further configured to:

obtain a vehicle operational parameter from the vehicle, wherein the vehicle operational parameter comprises a vehicle State of Charge (SOC) level;

determine that a third predefined condition is met based on the vehicle operational parameter, wherein the third predefined condition is met when the vehicle SOC level is less than a first predetermined threshold; and disable the vehicle from supplying power to the building.

5. The transfer switch of claim 4, wherein the third predefined condition is met when load requirements associated with the building is greater than a second predetermined threshold.

6. The transfer switch of claim 1, wherein the switch processor is further configured to:

transmit a wakeup signal to the vehicle responsive to a determination that the first predefined condition is met; and enable the vehicle to supply power to the building responsive to transmitting the wakeup signal.

7. The transfer switch of claim 1, wherein the transfer switch is installed at the building.

8. A method performed by a transfer switch configured to transfer power to a building, the method comprising:

obtaining, by the switch processor, an activation signal from the vehicle, wherein the activation signal indicates that a vehicle power transfer mode is activated, and wherein the switch processor determines that the power supply communication between the transfer switch and the vehicle is established responsive to obtaining the activation signal;

determining, by a switch processor, that a power supply communication between the transfer switch and a vehicle is established;

determining, by the processor, that a predefined condition is met based on inputs associated with a utility power supply of a power grid obtained from a switch detection unit, when the power supply communication is established, wherein the switch detection unit is configured to monitor the utility power supply from the power grid; and enabling, by the switch processor, the vehicle to supply power to the building responsive to a determination that the predefined condition is met.

9. The method of claim 8, wherein the predefined condition is met when the utility power supply is interrupted.

* * * * *